United States Patent [19]
Kawai

[11] Patent Number: 5,812,182
[45] Date of Patent: Sep. 22, 1998

[54] OPTICAL INFORMATION RECORDING MEDIUM FOR RECORDING ERASING AND PLAY BACK OF COMPACT DISC SIGNALS

[75] Inventor: Shoichi Kawai, Oobu, Japan

[73] Assignee: Nippondenso Co., Ltd., Kariya, Japan

[21] Appl. No.: 481,101

[22] Filed: Jun. 7, 1995

[51] Int. Cl.$^6$ ............ B41J 2/435; G01D 15/24; H01S 1/131; G11B 7/00

[52] U.S. Cl. ............ 347/262; 347/139; 346/135.1; 346/74.2

[58] Field of Search ............ 347/139, 154, 347/262, 264; 346/135.1, 139 A, 136, 74.2; 430/21

[56] References Cited

U.S. PATENT DOCUMENTS

5,228,024  7/1993  Moon et al. ............ 369/288

FOREIGN PATENT DOCUMENTS

| 0549024 | 6/1993 | European Pat. Off. |
| HEI 5-205316 | 8/1993 | Japan |
| 5-242531 | 9/1993 | Japan |
| 6-195753 | 7/1994 | Japan |
| 6-231487 | 8/1994 | Japan |

*Primary Examiner*—N. Le
*Assistant Examiner*—Raquel Yvette Gordon
*Attorney, Agent, or Firm*—Cushman Darby Cushman IP Group of Pillsbury Madison & Sutro LLP

[57] ABSTRACT

An optical information recording medium 10, being a reloadable optical information recording medium, has a first surface on which a pre-group is formed. A lower protective multi-layer film 2 consisting of a total of four film layers, a recording film layer 3, an upper protective film layer 4 and a reflective film layer 5 are successively accumulated on the first surface. On a second surface opposed to the first surface, there is formed an anti-reflective multi-layer film 6 consisting of an anti-reflective film (I) layer 6a and an anti-reflective film (II) layer 6b. Provided with the anti-reflective multi-layer film 6, the optical information recording medium 10 can eliminate reflections of irradiated light on the surface of its substrate. According to such an optical information recording medium, when either of the recorded region and the erased region of the recording film layer has a lower reflectance, the value of that reflectance can be further reduced without reducing the value of a reflectance of the other of the recorded region and the erased region. Accordingly, the amplitude modulation factor of the optical information recording medium can be increased with improvement of the C/N ratio and a reduction of reading errors.

12 Claims, 2 Drawing Sheets

OPTICAL INFORMATION RECORDING MEDIUM FOR RECORDING ERASING AND PLAY BACK OF COMPACT DISC SIGNALS

BACKGROUND OF THE INVENTION

1. Field of the Invention

This invention relates to an optical information recording medium capable of recording information using light.

2. Related Art

Compact Discs (abbreviated as CD) are wide spread and very well known as optical information recording medium dedicated to playback only.

Another, known reloadable optical information recording medium is a phase-change type medium which causes a reversible change of a crystal condition, i.e. amorphous-to-crystalline phase transition, when it is subjected to irradiation of light, thereby utilizing a change of reflectance generated as a result of such phase changes.

However, the performances required for a CD interchanging optical information recording medium is as follows. The reflectance of the erased region is not less than 65% and the C/N ratio (i.e. carrier signal level/noise level) is not less than 47 dB in signal intensity of signals.

The larger the C/N ratio, the smaller the reading error during playback of recording information.

To enlarge the C/N ratio, it is essential to expand the difference of reflectance between a recorded region and an erased region in the recording film layer for playback of the optical information recording medium.

In this respect, the following relation should be considered.

Amplitude Modulation Factor={(Reflectance of erased region)−(Reflectance of recorded region)}/(Reflectance of erased region)

That is, as long as the noise level remains at the same level, it is effective for optical information recording media to increase the amplitude modulation factor for improving their C/N ratios.

The inventor of the present invention has found that the reflectance of the recorded region is unnecessarily increased due to the reflection of light on the surface of a substrate of the optical information recording medium. From this fact, the inventor developed an idea of improving the C/N ratio of the optical information recording medium by enlarging the amplitude modulation factor of the same.

SUMMARY OF THE INVENTION

Accordingly, in view of above-described problems encountered in the related art, a principal object of the present invention is to provide an optical information recording medium capable of improving the C/N ratio by increasing the value of the amplitude modulation factor.

In order to accomplish this and other related objects, one aspect of the present invention provides an optical information recording medium comprising: a substrate having a first surface on which a lower protective film layer, a recording film layer, an upper protective film layer and a reflective film layer are successively accumulated; the substrate having a second surface opposed to the first surface; and at least one anti-reflective film layer formed on the second surface of the substrate, the anti-reflective film layer having a reflectance different from that of the substrate.

In the above optical information recording medium, it is preferable that the reflective film layer comprises single-element metals or their alloys. The anti-reflective film layer consists of multiple film layers accumulated one after another on the second surface of the substrate, and the multiple film layers have reflectances different from each other.

It is also preferable that the anti-reflective film layer is transparent against two lights having different wavelengths, and consists of multiple film layers accumulated one after another on the second surface of the substrate. The multiple film layers, have reflectances different from each other.

Furthermore, the recording film layer causes a phase change accompanying a change of an optical constant when the recording film layer is subjected to irradiation of light. Both a crystalline region and an amorphous region of the recording film layer have low reflectances against a light used for recording and erasing data, while either one of the crystalline region or the amorphous region has a high reflectance and the other region has a low reflectance against a light used for playback of data.

The lower protective film layer is transparent against the two lights having different wavelengths, and consists of multiple film layers accumulated one after another on the second surface of the substrate. The multiple film layers have reflectances different from each other.

More specifically, the crystalline region and amorphous region have reflectances not larger than 50% against the light used for recording and erasing data. The crystalline region has a reflectance not less than 65% against the light used for playback of data, with a difference between a reflectance of the amorphous region and the reflectance of the crystalline region being not less than 40%. A wavelength of the light used for playback of data is substantially 780 nm. Moreover, the recording film layer is made of a material chiefly comprising Ge—Sb—Te. And, the anti-reflective film layer has a reflectance lower than 2% against the two lights having different wavelengths.

With above arrangement, the optical information recording medium can reduce the reflection of irradiated light on the surface of the substrate due to provision of the anti-reflection film layer. Namely, almost 100% of the irradiated light is entered into the substrate of the optical information recording medium.

The reflectance of the recording film layer varies between the recorded region and the erased region. The total quantity of reflected light quantity in each region is identical with the multiplication of the quantity of total light quantity including the addition of excessive light entering from the substrate surface and the reflectance of each region.

More specifically, when the substrate surface causes a variation of reflectance from r1 to r2, the region of reflectance R which is either the recorded region or the erased region of the recording film layer will cause the corresponding change of reflectance expressed by the following approximation.

$$\{R(1-r2)+r2\} - \{R(1-r1)+r1\} = -(1-R)(r1-r2)$$

where r1 represents a reflectance of a substrate surface provided with no anti-reflection film layer, r2 represents a reflectance of a substrate surface provided with an anti-reflection film layer, and R represents a reflectance of either the recorded region or the erased region of the recording film layer.

The above formula shows that the change of reflectance toward a negative value increases with a reduction of the reflectance R of either the recorded region or the erased region of the recording film layer. Hence, according to the optical information recording medium of the present invention, when either of the recorded region and the erased region of the recording film layer has a lower reflectance, the value of that reflectance can be further reduced without reducing the value of a reflectance of the other of the recorded region and the erased region. Consequently, the amplitude modulation factor of the optical information recording medium can be increased with an improvement of the C/N ratio and a reduction of the number of reading errors.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENT

A preferred embodiment of the present invention will be explained in greater detail hereinafter, with reference to the accompanying drawings.

Figure 1:
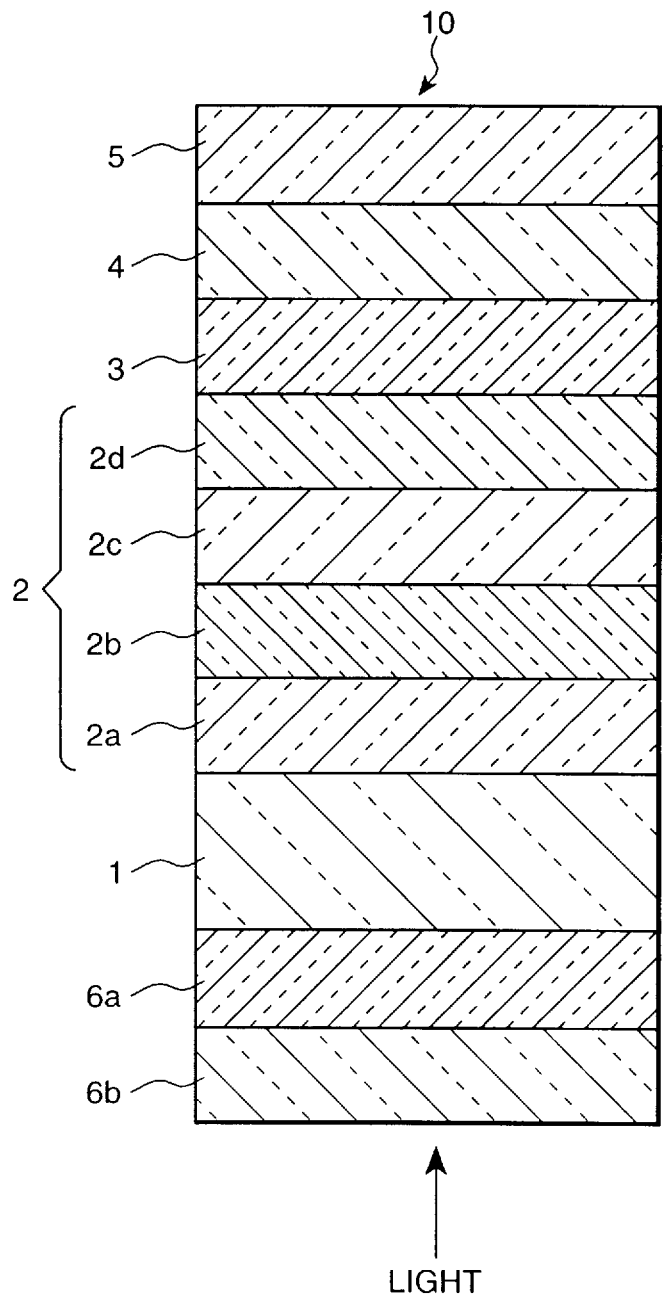
FIG. 1 is a typical view showing a cross-sectional arrangement of an optical information recording medium in accordance with one embodiment of the present invention.

FIG. 1 is a typical view showing a cross-sectional arrangement of an optical information recording medium in accordance with one embodiment of the present invention.

An optical information recording medium 10, which is a reloadable optical information recording medium, includes a disk-like substrate 1 made of transparent glass or plastic, and the following layers successively accumulated on the substrate 1.

The substrate 1, made of polycarbonate having a reflectance of 1.58, has a first surface on which a pre-group (a portion having a lower reflectance for tracking of optical pickup) is formed. A lower protective multi-layer film 2, acting as a lower protective film, is formed on the first surface of the substrate 1. The lower protective multi-layer film 2 consists of a total of four film layers 2a, 2b, 2c and 2d which are transparent against two predetermined lights having different wavelengths (i.e. one having a wavelength 780 nm for playback of data and the other having a wavelength 830 nm for recording and erasing data). Each adjacent two of these four film layers 2a, 2b, 2c and 2d have reflectances different from each other.

More specifically, the lower protective multi-layer film 2 comprises a lower protective film (I) layer 2a made of TiO2 (reflectance of 2.5) having a thickness of 80 nm, a lower protective film (II) layer 2b made of SiO2 (reflectance of 1.46) having a thickness of 110 nm, and a lower protective film (III) layer 2c made of TiO2 (reflectance of 2.5) having a thickness of 260 nm. These film layers 2a to 2c are formed by a sputtering method or a vacuum deposition method (the resistance heating method, the electron beam method or the ion plating method). TiO2 and SiO2 are used for targets serving as material sources for these layers. The TiO2 film layer can be formed by depositing Ti in an atmosphere of oxygen.

Furthermore, the lower protective multi-layer film 2 comprises a lower protective film (IV) layer 2d made of ZnS—SiO2 (reflectance of 2.0) having a thickness of 250 nm. The lower protective film (IV) layer 2d is also formed by the sputtering method or the vacuum deposition method. Sintered mixture of ZnS and SiO2 is used for a target serving as material source for this layer.

Next, a recording film layer 3 made of GeSbTe and having a thickness of 50 nm is formed on the lower protective multi-layer film 2. The recording film layer 3 is also formed by the sputtering method or the vacuum deposition method. Sintered mixture of Ge, Sb and Te (such as GeSb2Te4 and Ge2Sbp2Te5) is used for a target serving as a material source for this recording film layer 3. The recording film layer 3, when it is subjected to irradiation of light, causes a phase change (i.e. reversible change or transition of crystal condition between an amorphous phase and a crystalline phase) accompanying a change of its optical constant. In this recording film layer 3, both a crystalline region and an amorphous region have low reflectances against a light used for recording and erasing data, while either of the crystalline region and amorphous region has a high reflectance and the other has a low reflectance against a light used for playback of data.

Furthermore, a protective film layer 4 made of ZnS—SiO2 is formed on the recording film layer 3 so as to have a thickness of 200 nm. The protective film layer 4 is formed in the same manner as the lower protective film (IV) layer 2d. Yet further, a reflective film layer 5 made of Au having a thickness of 100 nm is formed on the protective film layer 4. The reflective film layer 5 is also formed by the sputtering method or the vacuum deposition method.

On the other hand, an anti-reflective multi-layer film 6 is formed on a second surface of the substrate 1 opposed to the first surface. There is no pre-group on the second surface. The anti-reflective multi-layer film 6, serving as an anti-reflective film, consists of a total of two film layers 6a and 6b which are transparent against the two predetermined lights having different wavelengths (i.e. one having a wavelength 780 nm for playback of data and the other having a wavelength 830 nm for recording and erasing data). These two film layers 6a and 6b have reflectances different from each other.

More specifically, the anti-reflective multi-layer film 6 comprises an anti-reflective film (I) layer 6a made of TiO2 (reflectance of 2.5) having a thickness of 20 nm, and an anti-reflective film (II) layer 6b made of MgF2 (reflectance of 1.38) having a thickness of 180. These film layers 6a and 6b are formed by the sputtering method or the vacuum deposition method (the resistance heating method, the electron beam method, or the ion plating method). TiO2 and MgF2 are used for targets serving as material sources for these film layers 6a and 6b. The TiO2 film layer can be formed by depositing Ti in the atmosphere of oxygen.

For the above-described optical information recording medium 10, the film to be coated as an anti-reflective film can be any of a multi-layer film and a single-layer film. When that the anti-reflective film has a multi-layer arrangement, the film layer closest to the substrate 1 should be an anti-reflective film layer having a reflectance different from that of the substrate 1, and the two adjacent anti-reflective film layers have reflectances different from each other. On the other hand, if the anti-reflective film is constituted by a single film layer, such a single film layer should have a reflectance different from that of the substrate 1.

Other materials that can be used for the anti-reflective film are oxides, sulfides and nitrides including Mg, Ca, Sr, Y, La, Ce, Ho, Er, Yb, Ti, Zr, Hf, V, Nb, Ta, Zn, Al, Si, Ge and Pb having higher transparencies and higher melting points, or fluorides including Ca, Mg and Li.

It is preferable that an overcoat of resin or the like is applied on the reflective film layer 5 of the above-described optical information recording medium 10. It is also possible to bond a protective plate or another optical information recording medium on a surface of the reflective film layer 5.

Figure 2:
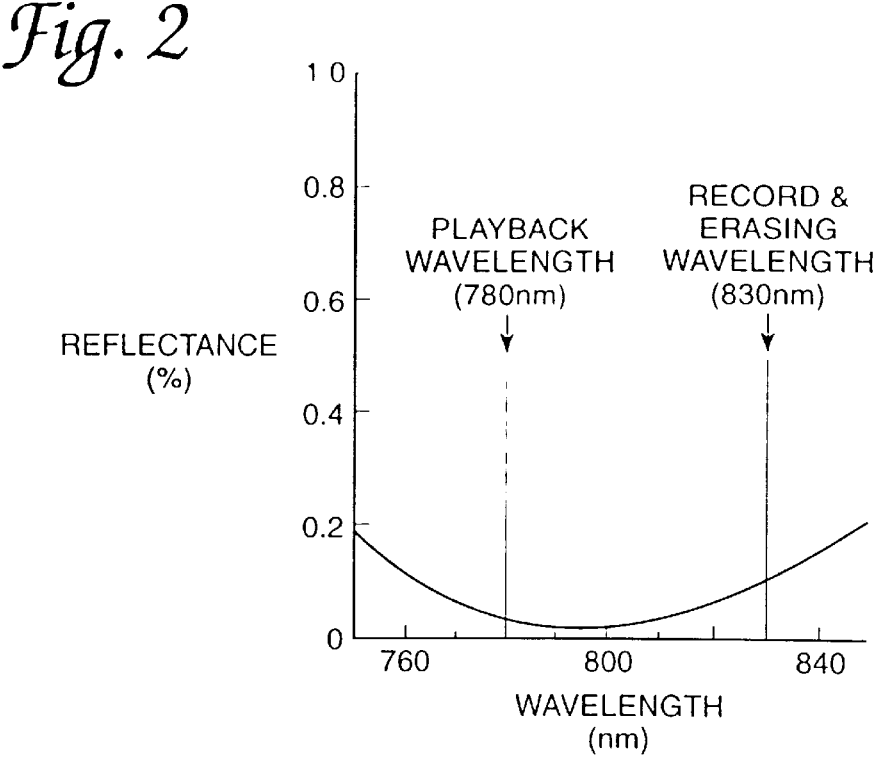
FIG. 2 is a graph of a simulation result under the condition that an anti-reflective multi-layer film is applied on the surface of a substrate of the optical information recording medium in accordance with the present invention, showing a dependency of a reflectance (%) of the substrate surface in relation to a wavelength (m) of the irradiated light.

FIG. 2 is a graph of a simulation result when an anti-reflective multi-layer film is applied on the surface of a substrate made of polycarbonate (reflectance; 1.58) in the same manner as in the above-described embodiment, showing a dependency of a reflectance (%) of the substrate surface in relation to a wavelength (m) of the irradiated light.

The reflectance of the substrate made of polyearbonate is approximately 5% on the surface on which no anti-reflective film is provided.

As apparent from FIG. 2, it is found that the reflectance is lowered, namely, 0.03% at the wavelength 780 nm (playback wavelength) and 0.1% at the wavelength 830 nm (record & erasing wavelength). In other words, it is concluded that the reflectance is considered substantially 0% at these particular wavelengths.

Figure 3:
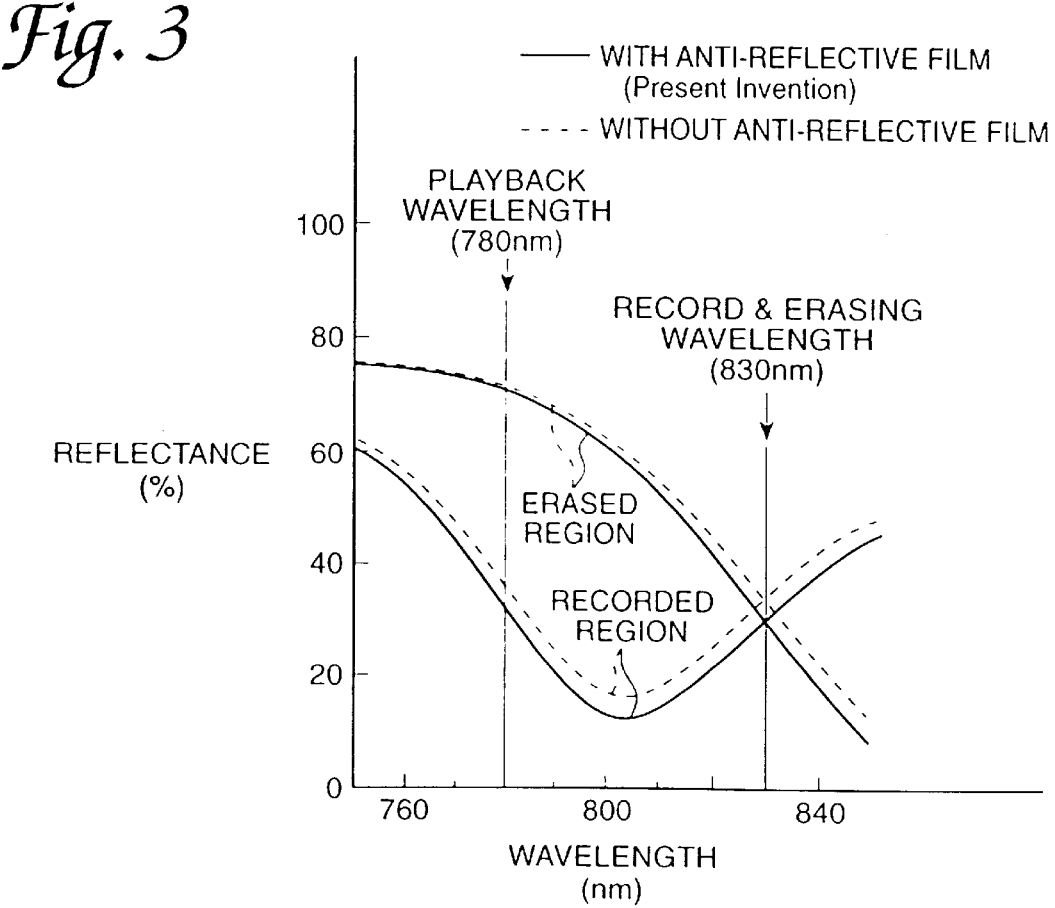
FIG. 3 is a graph of a simulation result showing a dependency of the reflectances (%) of the recorded region (i.e. amorphous region) and the erased region (i.e. crystalline region) in relation to the light wavelength (nm) in accordance with the optical information recording medium of the present invention.

FIG. 3 is a graph of a simulation result showing a dependency of the reflectances (%) of the recorded region (i.e. amorphous region) and the erased region (i.e. crystalline region) in relation to the light wavelength (nm) in accordance with the optical information recording medium of the present invention. In the graph of FIG. 3, data indicated by solid lines represent the optical information recording medium with an optical anti-reflective film.

The wavelength of light used for playback of the optical information recording medium 10 is 780 nm, while the wavelength of light used for record and erasing is 830 nm. For comparison, data indicated by dotted lines represent the optical information recording medium without the optical anti-reflective film on the surface of the substrate.

In the optical information recording medium with the anti-reflective film of the present invention, the reflectance of the erased region is approximately 70% at the playback wavelength 780 nm which is not substantially varied compared with the reflectance of the optical information recording medium having no anti-reflective film.

On the contrary, the reflectance of the recorded region is reduced from 35% to 31%. It means that the previously described amplitude modulation factor is increased from 50% to 56%.

From the above, it is confirmed that the reflectance at the playback wavelength (70%) satisfies the CD standard (65%). Hence, the playback operation on the CD playback apparatuses can be realized.

Moreover, at the record & erasing wavelength 830 nm, the reflectances of the erased region and the recorded region are both reduced from 34% to 30%. Thus, the optical absorption rate is increased by 4%.

More specifically, the optical information recording medium 10 having an arrangement shown in FIG. 1 brings the following effects by the provision of the anti-reflective film layer. That is, not only the C/N ratio is improved at the playback wavelength as intended, but the optical absorption rate is increased at the record & erasing wavelength. Hence, it becomes possible to reduce the quantity of optical power required for the recording and erasing of data.

As this invention may be embodied in several forms without departing from the spirit of essential characteristics thereof, the present embodiment as described is therefore intended to be only illustrative and not restrictive. Since the scope of the invention is defined by the appended claims rather than by the description preceding them, and all changes that fall within the metes and bounds of the claims, or equivalents of such metes and bounds, are therefore intended to be embraced by the claims.

What is claimed is:

1. An optical information recording medium comprising:
a substrate having a first surface on which a lower protective film layer, a recording film layer, an upper protective film layer and a reflective film layer are successively accumulated, said substrate having a second surface opposed to said first surface; and
at least one anti-reflective film layer formed on said second surface of said substrate, said anti-reflective film layer having a reflectance different from that of said substrate, wherein:
said recording film layer causes a phase change accompanying a change of optical constant when said recording film layer is subjected to irradiation of light, wherein both a crystalline region and an amorphous region of said recording film layer have low reflectances against a light used for recording and erasing data, while one of said crystalline region and said amorphous region has a high reflectance and an other of said crystalline region and said amorphous region has a low reflectance against a light used for playback of data; and
said anti-reflective film layer is transparent against said light used for said recording and said erasing of said data and said light used for said playback of said data, a wavelength of said light used for said playback of said data being different from a wavelength of said light used for said recording and said erasing of said data, and said anti-reflective film layer comprises multiple film layers accumulated one after another on said second surface of said substrate, said multiple film layers having reflectances different from each other, said anti-reflective film layer having a function of enlarging an amplitude modulation factor of said optical information recording medium.

2. The optical information recording medium in accordance with claim 1, wherein said reflective film layer comprises single-element metals or their alloys.

3. The optical information recording medium in accordance with claim 1, wherein said lower protective film layer is transparent against said said light used for said recording and said erasing of said data and said light used for said playback of said data, and comprises multiple film layers accumulated one after another on said first surface of said substrate, said multiple film layers having reflectances different from each other.

4. The optical information recording medium in accordance with claim 1, wherein said crystalline region and said amorphous region have reflectances being one of less than 50% and equal to 50% against said light use for said recording and said erasing of said data.

5. The optical information recording medium in accordance with claim 1, wherein said crystalline region has a reflectance being at least 65% against said light used for said playback of said data, with a difference between a reflectance of said amorphous region and said reflectance of said crystalline region being at least 40%.

6. The optical information recording medium in accordance with claim 1, wherein a wavelength of said light used for said playback of said data is substantially 780 nm.

7. The optical information recording medium in accordance with claim 1, wherein said recording film layer is made of a material chiefly comprising Ge—Sb—Te.

8. The optical information recording medium in accordance with claim 1, wherein said anti-reflective film layer has a reflectance lower than 2% against said light used for said playback of said data and said lights used for said recording and said erasing of said data.

9. The optical information recording medium in accordance with any one of claims 1 to 8, wherein said optical information recording medium is used for recording, erasing and playback of Compact Disc signals.

10. An optical information recording medium comprising:
   a substrate having a first surface on which a lower protective film layer, a recording layer, an upper protective film layer and a reflective film layer are successively accumulated, said substrate having a second surface opposed to said first surface;
   an anti-reflective film layer formed on said second surface of said substrate and having a reflectance different from a reflectance of said substrate, said anti-reflective film layer having a function of enlarging an amplitude modulation factor of said optical information recording medium; and
   said recording film layer causes a phase change accompanying a change of optical constant when said recording film layer is subjected to irradiation of light, wherein a crystalline region and an amorphous region of said recording film layer have low reflectances against a light used for recording and erasing data, while one of said crystalline region and said amorphous region has a high reflectance and an other of said crystalline region and said amorphous region has a low reflectance against a light used for playback of data, said light used for said recording and said erasing of said data having a wavelength being different from a wavelength of said light used for said playback of said data.

11. The optical information recording medium in accordance with claim 10, wherein said anti-reflective film layer comprises multiple film layers accumulated one after another on said second surface of said substrate, said multiple film layers having reflectances different from each other.

12. The optical information recording medium in accordance with claim 10, wherein said anti-reflective film layer is transparent against said light used for said recording and said erasing of said data and said light used for said playback of said data having different wavelengths, and comprises multiple film layers accumulated one after another on said second surface of said substrate, said multiple film layers having reflectances different from each other.

* * * * *